(12) United States Patent
Jiang

(10) Patent No.: US 9,784,914 B2
(45) Date of Patent: Oct. 10, 2017

(54) WAVEGUIDE SUPERLATTICES FOR HIGH DENSITY PHOTONICS INTEGRATIONS

(71) Applicant: Rutgers, The State University of New Jersey, New Brunswick, NJ (US)

(72) Inventor: Wei Jiang, Highland Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 0 days.

(21) Appl. No.: 15/021,845

(22) PCT Filed: Sep. 12, 2014

(86) PCT No.: PCT/US2014/055442
§ 371 (c)(1),
(2) Date: Mar. 14, 2016

(87) PCT Pub. No.: WO2015/038927
PCT Pub. Date: Mar. 19, 2015

(65) Prior Publication Data
US 2016/0231506 A1    Aug. 11, 2016

Related U.S. Application Data

(60) Provisional application No. 61/877,052, filed on Sep. 12, 2013.

(51) Int. Cl.
G02B 6/12    (2006.01)
G02B 6/122    (2006.01)
G02B 6/10    (2006.01)
G02B 6/293    (2006.01)

(52) U.S. Cl.
CPC ............. *G02B 6/122* (2013.01); *G02B 6/107* (2013.01); *G02B 6/2938* (2013.01)

(58) Field of Classification Search
CPC ....... G02B 6/122; G02B 6/107; G02B 6/2938
USPC ............................... 385/14, 24, 39, 129–132
See application file for complete search history.

(56) References Cited

U.S. PATENT DOCUMENTS

| | | | |
|---|---|---|---|
| 4,630,885 A | 12/1986 | Haavisto | |
| 6,373,872 B2 * | 4/2002 | Deacon | ........................ 372/102 |
| 7,421,179 B1 | 9/2008 | Jiang et al. | |
| 7,440,658 B2 * | 10/2008 | Furuya | ................... B82Y 20/00 385/39 |
| 2007/0280592 A1 * | 12/2007 | Furuya | ................... B82Y 20/00 385/27 |

(Continued)

*Primary Examiner* — Ellen Kim
(74) *Attorney, Agent, or Firm* — Fox Rothschild LLP

(57) ABSTRACT

An apparatus and method for transmitting a plurality of light signals is disclosed. The apparatus includes a splitter configured to split an incoming light signal into a plurality of light signals. Phase control units are included which modify the phase of the light signals. Waveguides are coupled to the phase control units. Each waveguide has a different propagation constant, that is different from adjacent waveguides and the difference between the propagation constants of any two adjacent waveguides is substantially larger than an effective coupling constant between said two adjacent waveguides. Coupling members couple the light signal in one of the plurality of waveguides to free space. The splitter may include output and/or input waveguides and a dispersion element splitting and/or combining: light.

30 Claims, 10 Drawing Sheets

(56) References Cited

U.S. PATENT DOCUMENTS

2011/0170822 A1\* 7/2011 Avrutsky ............... B82Y 20/00
  385/11
2014/0023309 A1 1/2014 Jiang \* cited by examiner

WAVEGUIDE SUPERLATTICES FOR HIGH DENSITY PHOTONICS INTEGRATIONS

CROSS-REFERENCE TO RELATED APPLICATIONS

This application is the U.S. National Phase of International Patent Application Serial No. PCT/US14/55442 filed Sep. 12, 2014 which claims the benefit of priority under 35 U.S.C. §119(e) of U.S. Provisional Application Ser. No. 61/877,052 filed on Sep. 12, 2013, the disclosures of which are incorporated herein by reference in its entireties.

BACKGROUND OF THE INVENTION

Silicon photonics can potentially offer low-cost large-scale integration for photonics technology. Integration density is a key factor for its integration potential and economy of scale. Existing silicon photonics technology has not achieved integration density of one waveguide per micron. Although there exist approaches to high-density photonics integration at the expense of other performance metrics (e.g., Optical loss and/or crosstalk), a solution to high density photonics integration with minimal impact on other aspects of performance remain a central problem in practical photonic systems. Crosstalk between adjacent waveguiding components sets a fundamental limit for integration density. As the waveguide spacing decreases to the wavelength scale, crosstalk rises up exponentially. With high index contrast of silicon waveguides, while it is relatively easy to decrease the waveguide spacing to a few microns, below this limit every small decrease appears to be accompanied by intolerable surge of crosstalk.

Silicon photonics holds great promise for low-cost large-scale photonic integration. In its future development, integration density will play an ever increasing role in a way similar to that witnessed in integrated circuits. Waveguides are perhaps the most ubiquitous component in silicon photonics. As such, the density of waveguide elements is expected to have a crucial influence on the integration density of a silicon photonic chip. A solution to high-density waveguide integration with minimal impact on other performance metrics such as crosstalk remains a vital issue in many applications.

Waveguide arrays are the cornerstone of optical communication devices and systems. For example, optical switching fabrics usually comprise massive waveguide arrays. Also, many devices, such as a wavelength demultiplexer and an integrated optical phased array, often employ a dense waveguide array for output. On the other hand, a waveguide array can be considered a discrete lattice of waveguides, which lends itself to a wide range of fascinating scientific studies (e.g., Anderson localization of light and parity-time symmetry) pertaining to condensed matter physics. In the cross-section of a waveguide array, a periodic lattice of high-index waveguide cores are embedded in a low-index background, in analogy to a periodic lattice of atoms. This has inspired researchers to apply many concepts rooted in condensed matter physics to the study of waveguide lattices, creating new frontiers in optics. In both device research and scientific studies, waveguide lattices generally have a large pitch, ranging from a few microns to tens of microns. As such, the inter-coupling between waveguides can be weak, which helps to reduce crosstalk. The subwavelength or submicron regime of lattice pitch has not been deliberately explored thus far. In addition, a simple lattice has usually been assumed.

SUMMARY OF THE INVENTION

In this document, an approach is proposed and demonstrated for achieving high-density waveguide integration toward the half-wavelength scale based on waveguide superlattices. Such high density waveguide lattices will not only significantly impact the economy of scale of integrated photonics technology, but also potentially enable breakthroughs in a wide range of devices and applications, such as optical phased arrays and space division multiplexing.

More specifically, the present invention relates to systems and methods for transmitting a plurality of channels of light signals. The systems comprise a plurality of waveguides. A propagation constant of each waveguide is different from adjacent waveguides. The difference between the propagation constants of two adjacent waveguides is substantially larger than an effective coupling constant therebetween.

In some scenarios, the propagation constant of each of waveguide may comprise a small random variation which is set by fabrication process. Also, the nominal propagation constants of the waveguides: may vary periodically with an index of the plurality of waveguides; or be identical for every two, three, four, five, or more waveguides (i.e., $\beta_{i+5}=\beta_i$). The term "nominal", as used here, refers to a designed value and/or an actual averaged value of a propagation constant of a fabricated waveguide which contains some random variations.

In these and other scenarios, the difference between the propagation constants of the two adjacent waveguides is obtained by: (1) making the waveguides with different widths; (2) making the waveguides with different heights; and/or (3) incorporating different materials into different ones of the waveguides. In some scenarios, any two of the waveguides, which have the smallest non-zero difference between their nominal propagation constants, may be separated by at least one other waveguide in-between.

The width of each of the plurality of waveguides may comprise a small random variation which is set by fabrication process. In some scenarios, any two of the waveguides that have the smallest non-zero difference of their nominal width may be separated by at least one other waveguide in-between. Additionally or alternatively, the nominal widths of the waveguides: may vary periodically with the index thereof; or be identical for every two, three, four, five, or more waveguides.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects as illustrative. The scope of the invention is, therefore, indicated by the appended claims. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Figure 1:
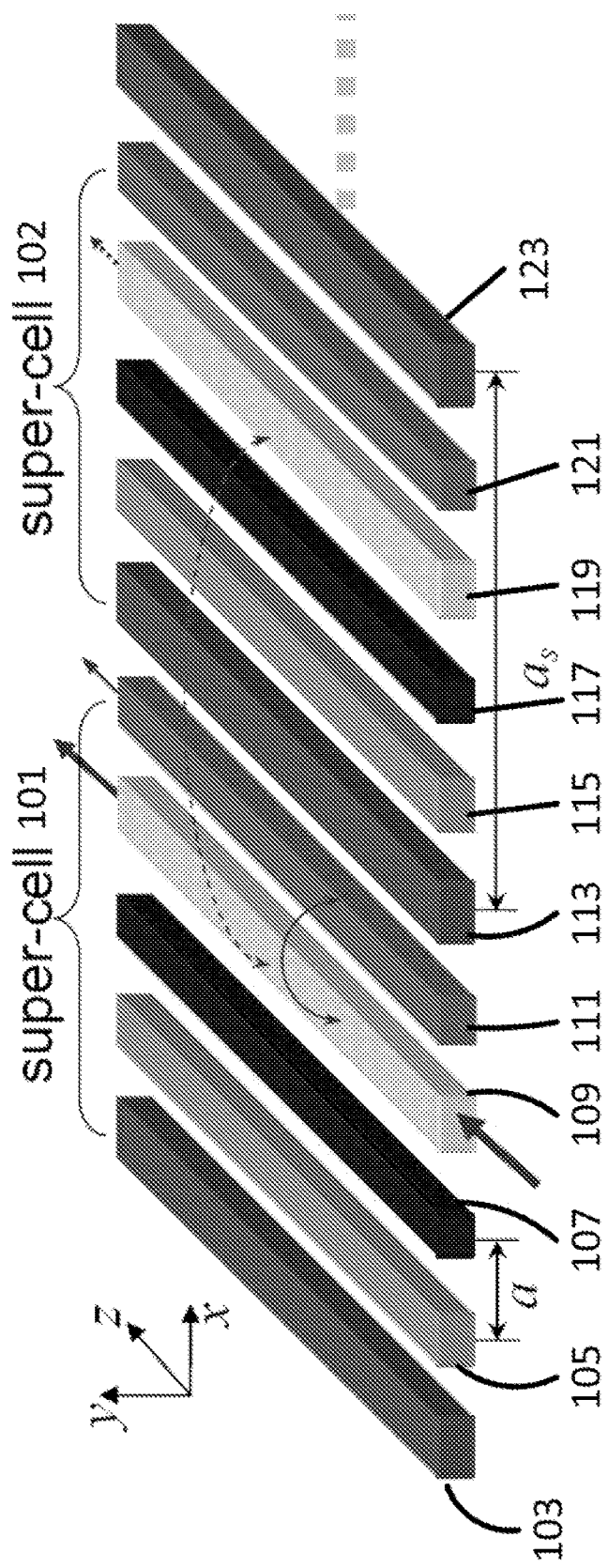
FIG. 1 is a schematic drawing of a waveguide superlattice.

The present invention generally concerns superlattices of waveguides. As such, a superlattice of waveguides (FIG. 1) is described in this document, whose unit cell (supercell) 101, 102 each comprises a sub-array of waveguides 103, 105, 107, 109, 111, and 113, 115, 117, 119, 121, respectively. The complex light inter-coupling in such a superlattice is also discussed herein. The superlattice exhibits the possibility of extremely weak light coupling even as the waveguide spacing approaches the half wavelength. This not only leads to high-density integration of silicon waveguides at very low crosstalk, but also potentially opens up unprecedented opportunities for optical phased arrays, and potentially a new platform for exploring Anderson localization of light.

To understand the physics of inter-coupling in a waveguide superlattice, a description is provided of the simplest superlattice cell (supercell) consisting of two disparate atoms, i.e., two waveguides of different propagation constants. Thereafter, more sophisticated superlattices are discussed. Within a "diatomic" supercell, the normalized transferred optical power $P_{1\to 2}$ from one waveguide to another after a propagation distance L is given by mathematical Equation (1).

$$\frac{P_{1\to 2}}{P_1} = \frac{1}{(\Delta\beta/2\kappa)^2 + 1} \sin^2\left(\sqrt{(\Delta\beta/2)^2 + \kappa^2}\, L\right), \quad \text{Equation (1)}$$

where Δβ is the propagation constant difference (or phase mismatch) between two waveguides in each supercell, and κ the coupling strength. The maximum crosstalk is given by mathematical Equation (2)

$$\max_L [P_{1\to 2}/P_1] = 1/[(\Delta\beta/2\kappa)^2 + 1] \quad \text{Equation (2)}$$

Figure 2:
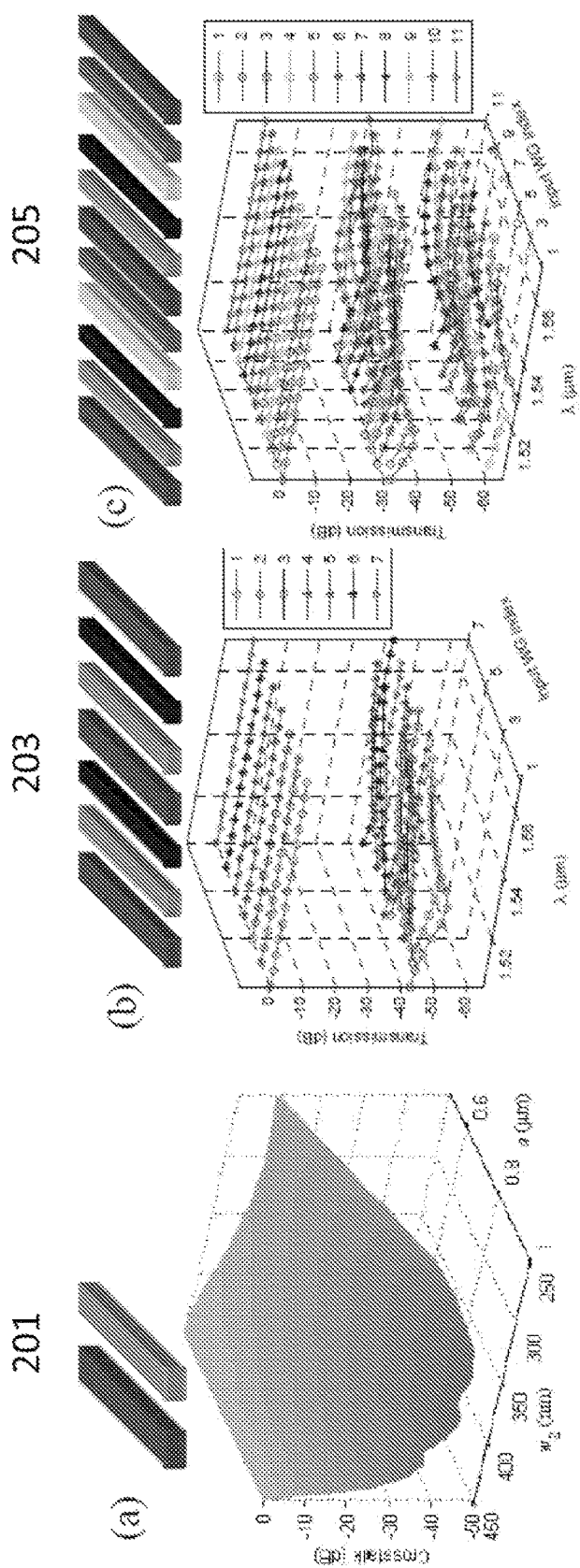
FIG. 2(a) is a graph showing a crosstalk between a pair of waveguides of different widths.
FIG. 2(b) is a graph showing crosstalk simulation results for an SC3 superlattice with a 1 μm pitch and a 200 μm propagation distance.
FIG. 2(c) is a graph showing crosstalk simulation results for an SC5 superlattice with a 0.8 μm pitch and a 200 μm propagation distance.

If the coupling strength κ is significantly weaker than the phase mismatch Δβ(Δβ≫κ), then the transferred power (waveguide crosstalk) is very weak. There are many methods of creating Δβ between adjacent waveguides. For practical fabrication considerations, the waveguide widths may be varied. Detailed theoretical calculation results are shown in FIG. 2(a) for pairs of waveguides in which the first waveguide has a fixed waveguide width $w_1$ of 450 nm and the second waveguide width $w_2$ which is variable. Evidently, the crosstalk between the waveguide pair can be reduced to far below −20 dB with sufficient Δβ even for pitch a of approximately 0.8 μm. However, when such a waveguide pair is periodically replicated in space to form a waveguide superlattice, the power transfer between the identical waveguide in adjacent supercells (at a spacing of $a_s$=2a) remains high (e.g., crosstalk>−14 dB for $a_s$=2 μm, see FIG. 8), because the identical waveguides have Δβ=0. To deter such coupling beyond nearest neighbors, non-trivial waveguide superlattices must be explored.

To explore sophisticated superlattice structures for crosstalk suppression, essential principles in superlattice design and the physics behind these constraints are described. First, to build a superlattice, different species of "atoms" (waveguides of different widths w) are needed because such "atoms" can be fabricated relatively easily by very-large-scale integration (VLSI) technology. More species of atoms may be desirable for more superlattice design latitude. However, there may be two physical constraints that limit the range of available waveguide widths. These physical constraints include: (1) the maximum waveguide width may be constrained by the single-mode condition (e.g., $w_{max}$~450 nm); and (2) for a very narrow waveguide, the width of the optical mode may increase significantly as the waveguide width decreases. This may in turn enlarge the mode overlap between neighboring waveguides, and may enhance their inter-coupling strength $\kappa_{n,n+k}$ (k=±1, ±2, ...). Eventually, at a sufficiently narrow waveguide width w, crosstalk may start to increase because the increase in $\kappa_{n,n+k}$ cancels out any benefit introduced by increasing Δβ. This effect can be illustrated by a special case, a pair of waveguides, in which only the nearest-neighbor coupling is present. FIG. 2(a) shows numerically calculated maximum crosstalk, as calculated above, for a pair 201 in which the first waveguide has a width of $w_1$=450 nm and the second waveguide width, $w_2$, is varied. Clearly, at a sufficiently narrow $w_2$, crosstalk starts to increase (for a given pitch). Considering this limit and also noting that narrow waveguides tend to have higher loss, the narrowest waveguide used in the superlattices is set to be around 330 nm wide.

Second, in a sophisticated superlattice many effects may come up due to the complex inter-coupling. For example, the inter-coupling may cause effective phase constant β to deviate from the intrinsic β of an isolated waveguide. Furthermore, light transport may also comprise contribution from inter-waveguide scattering due to structure imperfections (e.g. waveguide sidewall roughness), which will be discussed later as a secondary effect. Hence, a rigorous theory is needed to model light transport in a superlattice. Note that approximate theories based on small index contrast cannot be applied to silicon waveguides. Here a fully-vectorial waveguide mode theory previously developed for a high-index-contrast photonic crystal waveguide has been employed. Mathematical Equation (3) shows how the amplitude of the mode, $c_n'$, can be solved.

$$\sum_n c_n'(z) \Delta A_{mn} + \sum_n \left( i \frac{\partial c_n'}{\partial z} + \beta_n \right) B_{mn} = 0, \quad \text{Equation (3)}$$

where $\beta_n$ is the propagation constant of the original mode of the n-th waveguide, $B_{mn}$ is related to the overlap integral between modes m and n, and $\Delta A_{mn}$ is the perturbation potential matrix element. In addition, $n_{super}$ denotes the number of waveguides in a supercell, and the superlattice period is given by $a_s = n_{super} a$. To include contributions of all coupling paths, a full matrix ΔA is used rather than limiting to the nearest-neighbors only (i.e. only $\Delta A_{n,n\pm 1}$).

Third, despite the complexity of superlattice coupling, some heuristic guidelines can be developed to design the superlattices. For example, while the propagation constants of the superlattice modes ($\Lambda_n$) deviate from those of the original waveguide modes ($\beta_n$), our simulations indicate that the crosstalk between waveguide #m and #n tends to be small if $\Lambda_m - \Lambda_n$ is sufficiently large. It can be further shown that two superlattice modes can have sufficient phase mismatch $$\Lambda_m - \Lambda_n \text{ if } |K_{mn} - K_{nm}| \gg \sum_{k \neq m} |K_{mk}| + \sum_{k \neq n} |K_{nk}| \quad \text{Equation (4)}$$

where $[K]=[B]^{-1}[\Delta A]+[\beta]$ and $[\beta]$ is a diagonal matrix whose elements are $\beta_n$. The sums in the inequality indicate that all coupling terms, rather than only the nearest-neighbor coupling, must be considered to minimize the crosstalk in a waveguide array in general. This inequality helps to quickly rule out some structures without numerically solving Eq. (3), which is important when searching a large design space for the superlattice structures.

As a first step, a lattice is designed with three waveguides in each supercell (referred to as "SC3" hereafter). The waveguide width may be spread between the upper and lower bounds set above (e.g., waveguide widths of 450, 380, and 330 nm). Simulations show that the SC3 superlattice can achieve <−30 dB crosstalk between nearest neighbors at 1 μm pitch, as depicted in FIG. 2(a). Such a SC3 superlattice with a pitch of 1 μm and a length of 200 μm was fabricated, as described in more detail below, on a silicon-on-insulator chip. In FIGS. 2(b) and 2(c), transmission $T_{i,j}(\lambda)$ for a given input waveguide ("WG") i and different output waveguides j are plotted in one plane (e.g., $T_{1,j}$ all in the first plane). The curve for each output port j is marked by a different color/symbol, as shown in the legend.

Figure 3:
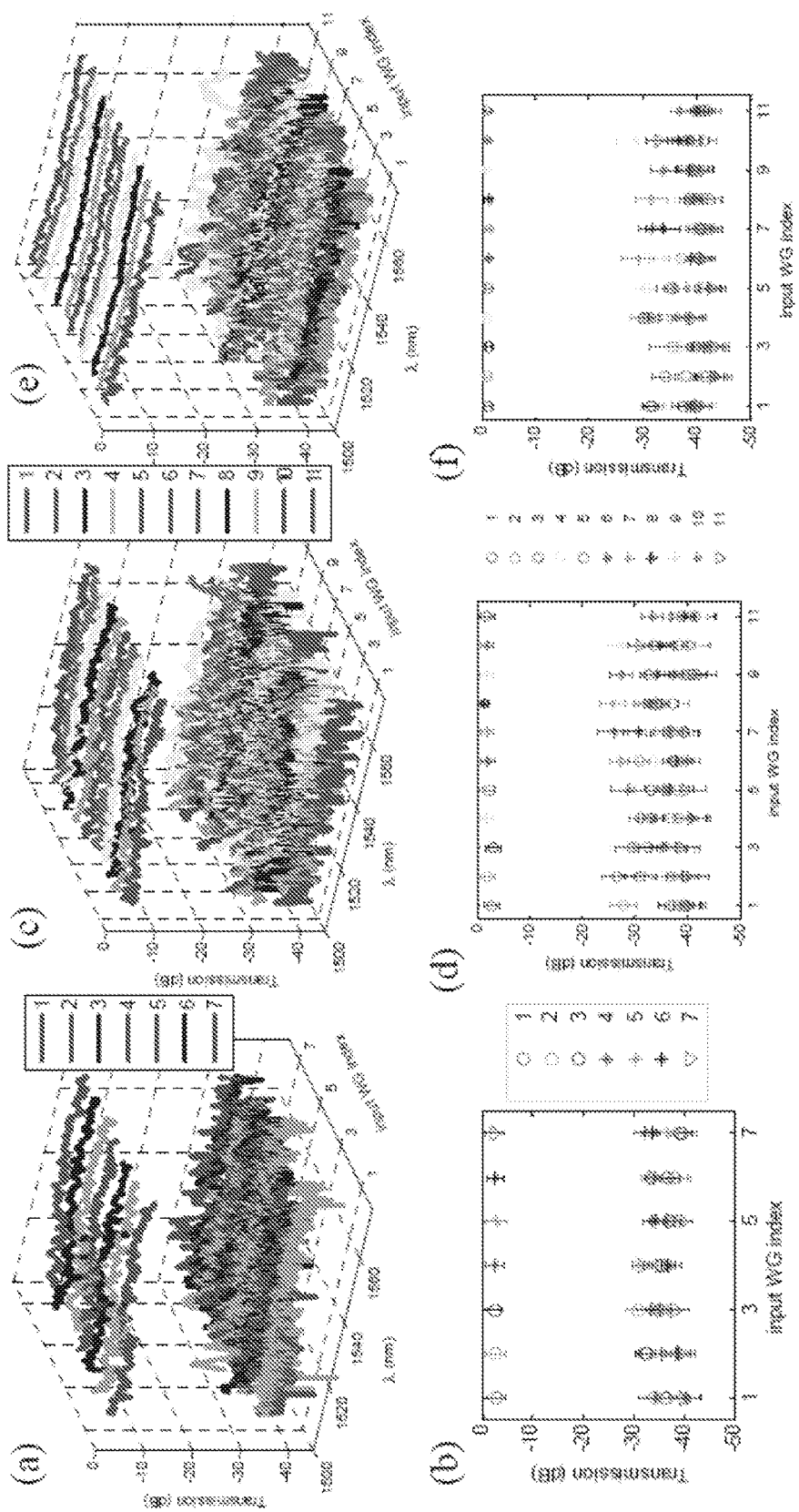
FIG. 3 comprises a plurality of graphs (a)-(b) for a measured transmission spectra and various statistics for an SC3 superlattice and a plurality of graphs (c)-(d), (e)-(f) for SC5 superlattices.

The measured transmission spectra are shown in FIG. 3(a). As a starting point, two superlattice periods (plus one extra #7 for a rough estimate of crosstalk over $2a_s$) may be modeled to save time in simulation, fabrication and measurement. For light input into a given waveguide i, output spectra of all seven waveguides $T_{ij}(\lambda)$, j=1, 2, ..., 7, may be measured (7×7=49 spectra in total). For a visual comparison of crosstalk between different channels, the set of transmission spectra originating from one input waveguide may be normalized by referencing to the peak transmission of the corresponding direct through channel (e.g., $T_{3j}(\lambda)$ all normalized by the peak of $T_{33}(\lambda)$) so that each direct through channel has its peak all aligned at 0 dB. Note that by defining the maximum crosstalk from channel i to channel j as $XT_{max}(i, j)=\max[T_{ij}(\lambda)-T_{ii}(\lambda)]$, the crosstalk value is not affected by the normalization scheme of $T_{ij}$. Here, $T_{ij}(\lambda)$ is the transmission (in dB) from input waveguide i to output waveguide j.

To avoid a heavily cluttered presentation, for each input, the two nearest-neighbors ($T_{i,i\pm 1}$) plus the worst crosstalk channel are plotted in FIG. 3(a). Evidently, the crosstalk was fairly low. For ease of visual comparison, the statistics (mean and standard deviation) of each transmission spectrum $T_{ij}(\lambda)$ is plotted in FIG. 3(b). Note that the true crosstalk for many channels may be small (e.g. $T_{26}$<−80 dB) and may be below the noise floor of our measurement setup. The values of these channels are measured and shown in FIG. 3(b) to verify that crosstalk is low enough for most applications. The overall crosstalk level of the leading crosstalk channels in FIG. 3(b) is several dB higher than the theoretical results in FIG. 2(b), but still within a reasonable range considering the noise floor of the measurement setup and the noise due to scattering from sidewall roughness, which will be discussed below. The peaks of all crosstalk channels are in the range of −24 dB to −20 dB. However, when the pitch a is reduced below 1 μm, this SC3 structure produces significantly higher crosstalk. For example, for a SC3 superlattice with a=0.8 μm, the peak crosstalk channel $XT_{max}(2,5)$ can surge above −10 dB.

To further reduce crosstalk in to the submicron-pitch regime, simple expansion of the supercell size (e.g. to SC4) will encounter significant challenges and new design concepts may be introduced. Due to the constraint of the waveguide width range discussed above, an insertion of an extra waveguide in this width range into a supercell may reduce minimum Δw in the superlattice and hence reduce the phase mismatch between certain waveguides (e.g. inserting a w=420 nm waveguide into the SC3 supercell above to expand to a SC4 supercell reduces the minimum Δw to 30 nm). Interestingly, for $n_{super}$>3, lower superlattice-level symmetry unleashes enormous design freedom through permutation of the waveguides in a supercell. Note that for $n_{super}$≤3, after classifying all permutations that are equivalent by translation/inversion symmetry, there is essentially one unique order once the set of waveguide widths are decided. Consider the case of $n_{super}$=5, and assume five waveguide widths satisfy $w_a$>$w_b$>$w_c$>$w_d$>$w_e$. In this case, a simple descending (or ascending) order of the waveguide widths ($w_a$ $w_b$ $w_c$ $w_d$ $w_e$) in a supercell may not be optimal for crosstalk reduction. We discover that an interlacing recombination configuration significantly reduces the crosstalk. In this configuration, two interlacing sub-arrays ($w_a$ $w_c$ $w_e$) and ($w_b$ $w_d$) of the original descending-ordered array recombine head-to-tail into a supercell ($w_a$ $w_c$ $w_e$ $w_b$ $w_d$). As such, any two waveguides that have the least width difference (e.g. $w_c$ and $w_b$) are separated by at least 2a rather than a. This larger separation significantly reduces the crosstalk between these two waveguides that have the least phase mismatch, as shown in FIG. 2(c), which shows the simulation results for a SC5 superlattice whose supercell comprises 200 μm long waveguides of widths 450, 390, 330, 420, and 360 nm at pitch a=0.8 μm. Its measured spectra are shown in FIG. 3(c) and its spectral statistics in FIG. 3(d). Compared to the statistics of the SC3 superlattice at a=1 μm in FIG. 3(b), the overall crosstalk rose, substantially spreading into the −30 to −20 dB range. The trend is consistent with the theoretical results in FIGS. 2(b) and (c). Note that the overall maximum crosstalk $XT_{max}(7,6)$=−18.8 dB is substantially above the theoretical prediction.

Figure 7:
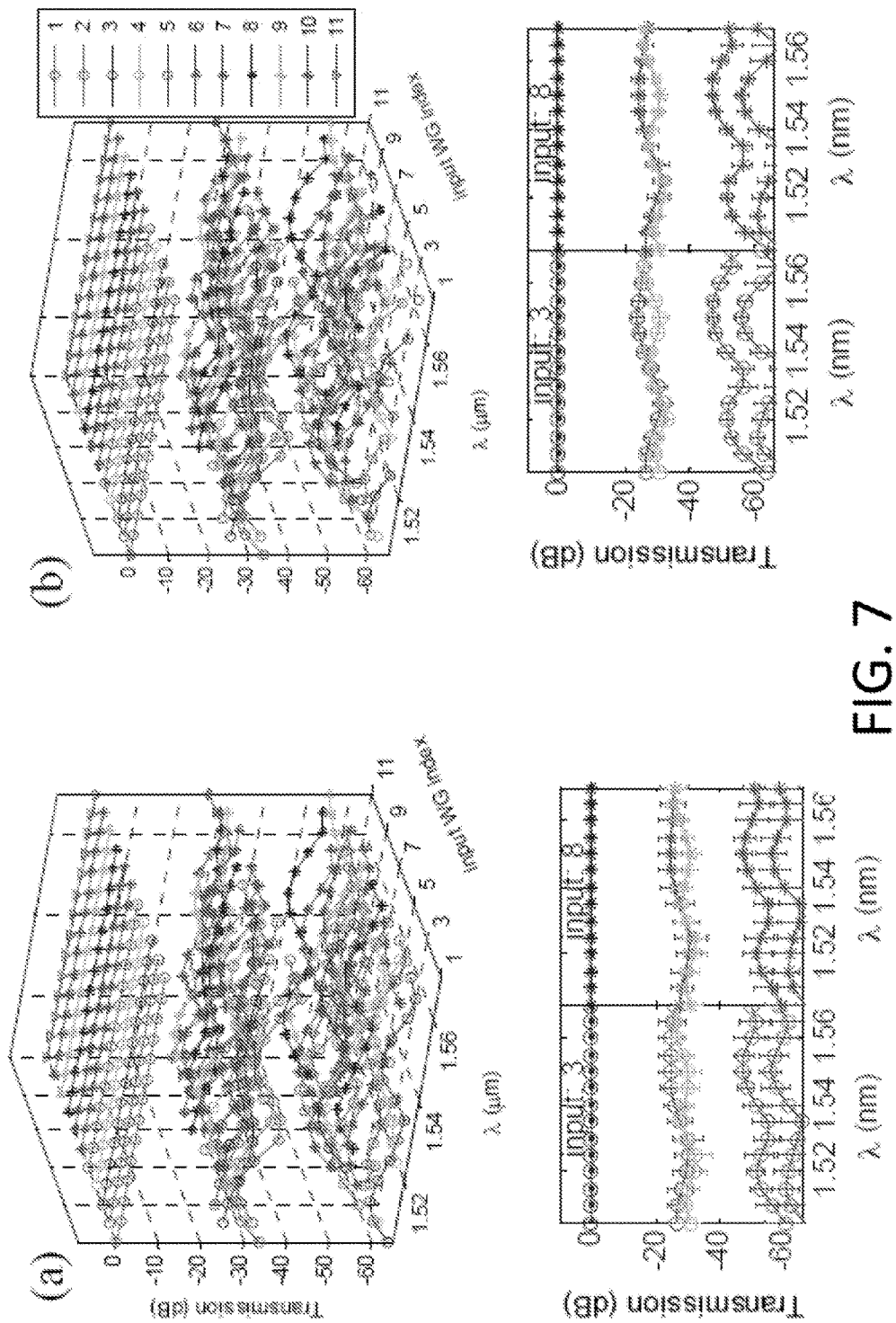
FIG. 7 comprises a graph (a) showing the effect of sidewall roughness in an SC5 superlattice (a=800 nm, L=500 μm) with σ=3 nm, $l_c$=50 nm, and a graph (b) showing the effect of sidewall roughness in an SC5 superlattice with σ=2 nm, $l_c$=30 nm.

The high maximum channel crosstalk in FIG. 3(c) can be attributed in part to the random light scattering between different waveguide modes due to sidewall roughness. Roughness induced scattering loss has been studied in single waveguides. In a waveguide superlattice, scattering can cause crosstalk fluctuation or noise. Detailed simulations show that the crosstalk fluctuation can be much reduced (see FIG. 7(b) discussed below in the section entitled "Supplementary Information") if the sidewall roughness can be reduced. In light of this, an ultrafine-resolution e-beam resist hydrogen silsesquioxane (HSQ), instead of the previous moderate-resolution ma-N resist, may be used to fabricate a 500 μm long SC5 superlattice. The measured spectra are depicted in FIG. 3(e) and their statistics in FIG. 3(f). Compared to the SC5 superlattice in FIG. 3(c)-(d), the standard deviations of the direct transmission spectra $T_{ii}$ may be substantially reduced, particularly for the direct transmission channels $T_{ii}$. This signifies a reduction of scattering-induced spectral noise, despite a longer L. The diminishing scattering also helps to suppress the overall maximum crosstalk of the entire superlattice to $XT_{max}(10, 9)$=−21.1 dB at λ~1565 nm. For reference, in a L=500 μm SC5 superlattice fabricated by the ma-N resist, the peak crosstalk of some channels may rise above −15 dB.

Figure 4:
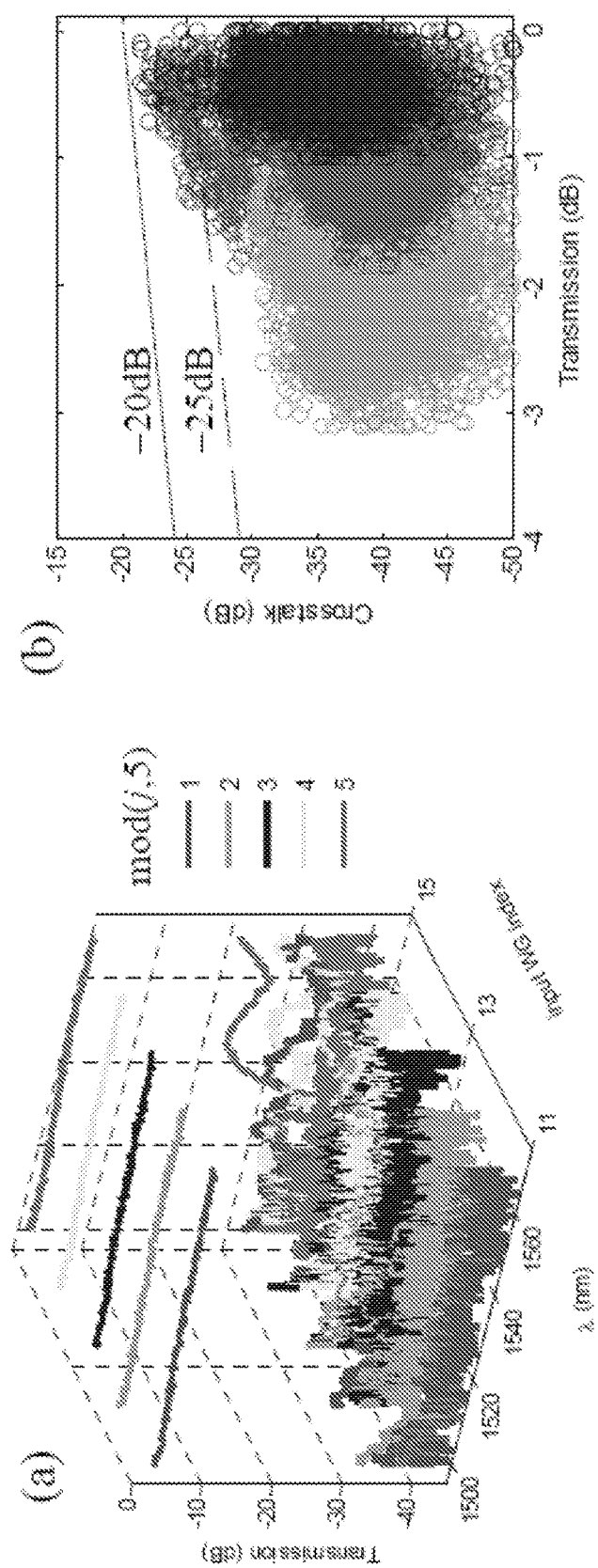
FIG. 4 comprises two graphs (a) and (b) showing the transmission spectra of a large-scale SC5 superlattice for each input waveguide in a superlattice period ($T_{i,j}$, i=1~15, j=i−5, i−4, . . . i+4, i+5).

To further demonstrate the characteristics of the waveguide superlattice beyond two supercells, a 500 μm long superlattice of five SC5 supercells at a pitch of a=0.78 μm using HSQ e-beam resist. The transmission from each of the five waveguides in the center supercell to its neighboring 11 waveguides within one superlattice period was measured and plotted in FIG. 4 (for example, for input waveguide #12, output spectra from #7 to #17 were measured). Evidently, the crosstalk remains low (<−20 dB) across the entire spectrum for all channels, with the overall maximum crosstalk being $XT_{max}(15,10)$=−21 dB. We have also checked the crosstalk for identical waveguides separated by two superlattice periods ($2a_s$=10a), their crosstalk spectra were generally sheer noise (~−30 dB or lower). In FIG. 4(a) the transmission spectra is shown. To avoid a cluttered view, only $T_{i,j±1}(\lambda)$ plus the worst are shown. In FIG. 4(b) a scatter plot of $T_{ij}$ vs. $T_{i,i}$ for all 50 crosstalk spectra (j≠i) is shown for three bands: λ≤1530 nm (light gray), 1530~1560 nm (dark gray), and 1560~1570 nm (black). The lines of $T_{i,j}$−$T_{i,i}$=−20, −25 dB are delineated. The crosstalk may remain low (<−20 dB) across the entire spectrum for all channels, with the worst case being $XT_{max}(15,10)$=−21 dB. Note that for each direct transmission channel, there are 10 crosstalk channels. Evidently, the crosstalk was always lower than −20 dB in all three bands, and the crosstalk in the short wavelength band (λ≤1530 nm) was even lower (<−25 dB).

Figure 5:
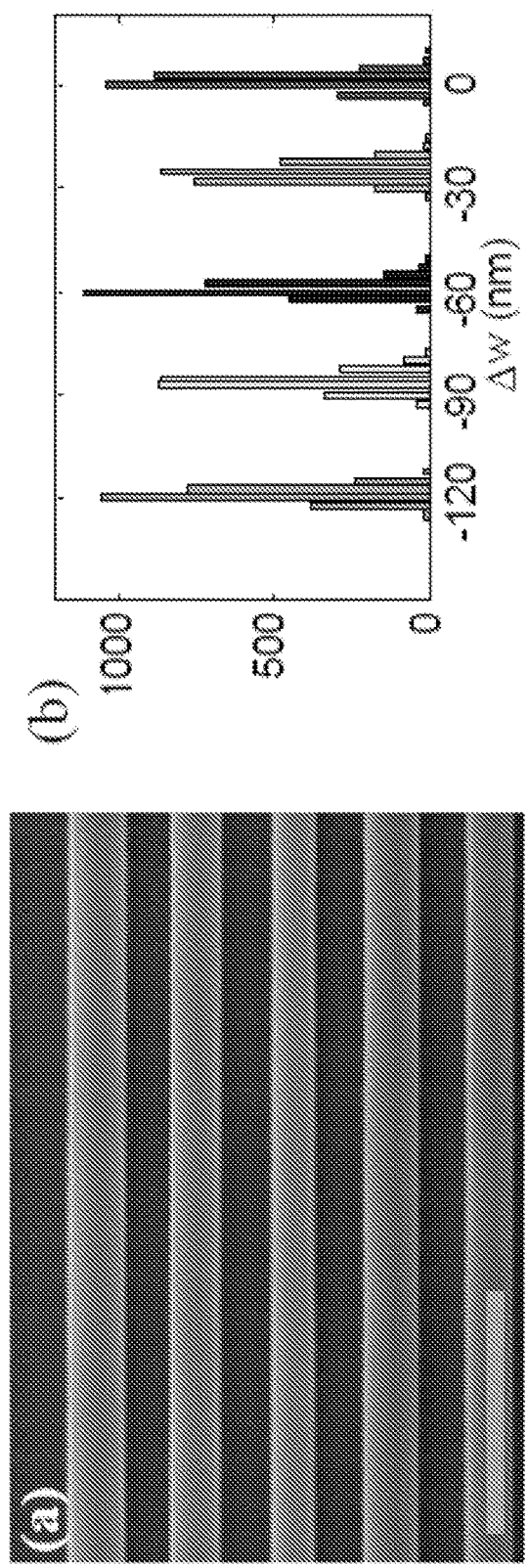
FIG. 5 comprises a graph (a) showing the width statistics for an SEM micrograph of one supercell in an SC5 superlattice (scale bar: 2 μm), 2, and a graph (b) showing the width distribution of the SC5 superlattice.

The waveguide widths of the a SC5 superlattice fabricated by HSQ resist have been characterized by high-resolution SEM as shown in FIG. 5. The width statistics of five waveguides in a supercell are shown in FIG. 5(b). In reference to the mean width <$w_1$> of the widest waveguide, the mean width differences (<$w_n$>−<$w_1$>) of the other waveguides are −60, −119, −26, and −87 nm, respectively, in good agreement with the designed values of −60, −120, −30, and −90 nm. The standard deviations of all waveguide widths are less than 2.7 nm. Note that the mean values of all waveguide widths had an overall shift ~12 nm from the designed values. This overall shift does not change the crosstalk significantly as long as the width difference among the waveguides is retained, according to our simulation (see FIG. 6(b)-(c) discussed below in the section entitled "Supplementary Information"). In other words, our design is robust against such an overall drift.

The waveguide superlattice demonstrated here can potentially help to significantly improve the integration density of waveguide elements, thereby enabling higher level of integration, and more advanced functionality in a given chip area and reducing the on-chip estate and of waveguide elements. In Si microelectronics, continual reduction of size and cost of transistors and increase of transistor density have driven the technology growth for decades (as encapsulated by Moore's law). In photonics, increasing the density of waveguides, which are perhaps the most ubiquitous elements in integrated photonics, has been challenging due to significant crosstalk at small pitches. Pronounced increase in waveguide density can be achieved by designing sophisticated superlattices that drastically suppress crosstalk. Such high-density waveguide superlattices with fine pitches can help to significantly enhance device performance/functionality and/or reduce device area and cost. For example, in wavelength multiplexers/demultiplexers based on echelle gratings, a key performance metric, the wavelength resolution between adjacent channels ($\Delta\lambda$), is proportional to the pitch of the input/output waveguide array and scales inversely with the overall device size. Using a submicron-pitch waveguide superlattice at input/output can result in salient improvement of wavelength resolution, which would otherwise require a device occupying a significantly larger area. Similar use may be found in some other types of wavelength multiplexers and spectrometers. High-density waveguide superlattices can also potentially enable ultra-dense space-division multiplexing (SDM) at the chip scale for optical interconnects in future high-performance computer chips, which may comprise >100 cores per chip. Using large waveguide arrays with >16,000 channels for such applications was discussed (although not using the term SDM explicitly) and the large area occupied by waveguide arrays due to relatively large pitches (about 3 μm or about 2λ) was a major concern. High-density waveguide superlattices demonstrated here can significantly reduce the area needed for SDM. This can potentially make SDM more attractive to partially substitute for or be used jointly with wavelength-division multiplexing (WDM) in some application scenarios, considering dense WDM devices are temperature-sensitive and relatively complicated.

As the waveguide pitch shrinks to the λ/2 mark (note a=λ/2 for λ=1560 nm in FIG. 4), some technologies may advance into a new regime. For example, a phased array ideally requires emitters with λ/2 pitches to achieve maximal beam steering range. Half-wavelength pitches are routinely used in microwave phased arrays, but have been a challenge for optical phased arrays (OPAs), The current waveguide superlattice can be used in certain silicon-based OPA configurations to deliver phase-modulated signals to an array of output waveguide-facets (or waveguide-gratings) radiating signals at λ/2 pitches, which results in λ/2-pitch optical phased arrays. Note that the width difference has no significant impact on the OPA performance and the associated phase-shift difference can be readily compensated (see detailed discussion in the Supplementary Information). Extension to 2D OPA is also possible with the help of membrane transfer and stacking technology.

Figure 8:
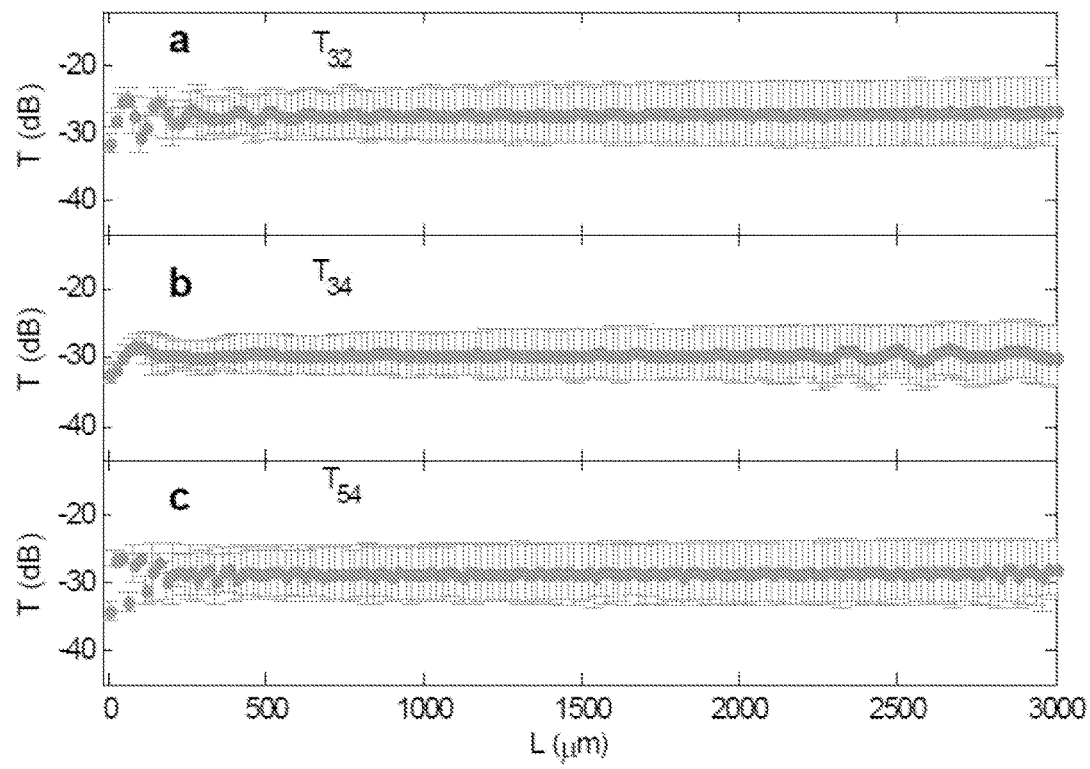
FIG. 8 shows a graph of statistics of several representative crosstalk channels for a SC5 superlattice as a function of superlattice length up to L=3 mm (a=0.8 μm, σ=2 nm, 4=30 nm) (a) $T_{32}$, (b) $T_{34}$, (C) $T_{54}$.
Figure 9:
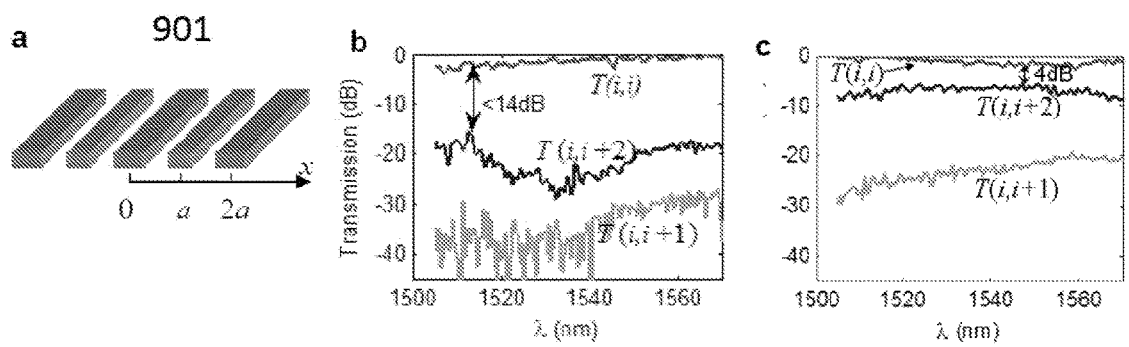
FIG. 9 is a graph showing typical transmission spectra of a superlattice of waveguide pairs (SC2); (a) schematic drawing of the structure; (b) spectra for a=1 μm; (c) spectra for a=0.8 μm.

Further down-scaling of the waveguide pitch can potentially be achieved through more sophisticated superlattice structures, tighter control of the waveguide width and roughness, and even modification of individual waveguide heights. Note that the dimension control required in the current work is well within the reach of the state-of-the-art silicon foundries and therefore is amenable to mass production. The superlattice lengths in this work are sufficient for some applications such as wavelength (de)multiplexers, spectrometers, and optical phased arrays, where only a short segment of high-density waveguide array is needed at the input/output to achieve high wavelength resolution or maximal beam steering range and then the dense waveguides can be spread out through waveguide bends to connect/couple to other part of the devices/systems. In longer superlattices, our simulations show that the mean crosstalk does not change significantly and the standard deviation of crosstalk tends to increase very slowly with L (see FIG. 8). Fabrication of longer superlattices can be done in mass-production-grade Si foundries, which can offer tight process control (e.g. roughness control and particle contamination control) over a large area. Note that reduction of crosstalk for a pair of waveguides has been experimentally studied in accordance with the well-known asymmetric directional coupler theory, but no clear route has been provided to scale the approach up to a large array. As shown in FIG. 9, simply replicating such an asymmetric pair of waveguides to form a SC2 superlattice will result in very poor crosstalk at submicron pitches (about −4 dB at a=0.8 μm, in contrast to <−20 dB crosstalk in a SC5 superlattice at this pitch based on the "interlacing-recombination" design). Note that plasmonic waveguides have the potential of achieving high waveguide density, but significant loss fundamentally limits their use in most practical applications.

The waveguide superlattice can also stimulate new directions in scientific studies. By introducing optical nonlinearity, waveguide superlattices may provide a playground for studying a rich spectrum of phenomena in nonlinear optics, disordered systems, and their interplay. For example, with nonlinear self-focusing in a discrete system, enhance light "localization" in each "atom" (waveguide), which will effectively reduce crosstalk and may enable even smaller pitches. As another example, phonon scattering of electrons in atomic crystals can be emulated by roughness-induced light scattering. Note that roughness effectively introduces a random phase dither $\Delta\beta_{rough}$, which deters coherent coupling between "identical" waveguides in neighboring supercells (see details in the Supplementary Information). Hence the results of this work suggest that the random nature of roughness/phonon may play two contrasting roles: it frustrates coherent coupling between identical atoms whereas induces incoherent scattering into non-identical atoms, resulting into two opposite localization trends. Such a complex localization behavior in a precisely designed superlattice may shed new light on metal-insulator transition in complex crystals. Note that many scientific studies may use different characterization schemes, such as imaging the optical field of an entire lattice, rather than characterizing the crosstalk between individual waveguides. The latter is more common for optical device applications of interest here. Also note that the structures considered in this study resemble an insulator with hopping-type transport, and are better described in the basis of individual waveguide modes rather than periodic Bloch modes In an example experimental procedure, the waveguide superlattice structures in this work may be fabricated by processes for making high-quality silicon nanophotonic structures [47]. Starting from a silicon-on-insulator wafer with a 2 μm buried oxide layer and a 260 nm top Si layer, a JEOL JBX-6300FS high-resolution e-beam lithography system was employed to pattern the waveguide structures. E-beam resists we used were either ma-N 2405 (Micro Resist Technology) or hydrogen silsesquioxane (Dow Corning). The effects of the resist choice on sidewall roughness and light scattering are discussed in detail in the Supplementary Information. Then the pattern was transferred to the top silicon layer of the wafer by reactive ion etching in an Oxford Plasmalab 100 ICP etcher. Finally, a 2 μm thick silicon oxide cover was deposited by plasma-enhanced chemical vapor deposition (PECVD). To facilitate measurement, the input and output ends of the waveguide superlattices were spread out to a large spacing through waveguide bends with radii≥100 μm (radii=50 μm for the 5-period superlattice to reduce the lateral pattern size), followed by a 100 μm long taper to a 450 nm wide access waveguide. The propagation loss of the silicon waveguides fabricated by HSQ resist ranges from ~0.6 dB/mm to ~0.9 dB/mm as the width decreases from 450 nm to 330 nm. The loss difference (propagation, taper loss) between waveguides of different widths is estimated <0.8 dB for the superlattices patterned by HSQ (actual loss had random fluctuation up to 2 dB). The propagation loss of waveguides made by ma-N is higher (about twice of those made by HSQ). To characterize the transmission spectra of a waveguide superlattice, light from a superluminescent LED with a spectral range of about 80 nm was coupled to the TE mode of a waveguide in the superlattice via a lensed fiber. The spectra of the output light from this waveguide and other waveguides were measured by an optical spectrum analyzer. Owing to mode-size mismatch between the lensed fiber (Gaussian spot size ~2.5 μm) and silicon waveguides, a portion of light from the input fiber did not enter the silicon waveguides but strayed outside. A small fraction of the stray light reached the output edge of the chip and entered the output lensed fiber. The amount of stray light entering the output lensed fiber was estimated around −60 dB, in reference to the input light from the lensed fiber, in typical experiments. For long wavelengths far from the peak of the broadband source we used, the source intensity could be fairly low (e.g. ~10 dB down from the peak). Adding an effective attenuation of 40~50 dB (>20 dB due to propagation and coupling loss, 20~25 dB due to relative crosstalk), the crosstalk signal of the output waveguides at long wavelengths could diminish to a level comparable to the noise floor of the optical spectrum analyzer (OSA). The above factors (relatively weak crosstalk signal, stray light, and noise floor of the OSA) limited the lowest crosstalk that can be measured.

Supplementary Information

The overall theoretical formalism is based on a rigorous theory previously developed for high index-contrast waveguides, for example photonic crystal waveguides. Here this theory is adapted to simulate an array of waveguides forming a superlattice.

In terms of transverse electric and magnetic fields, the optical modes in an array of waveguides are governed by the following equation mathematical equations (5) and (6).

$$\hat{A}|\psi\rangle = -i\frac{\partial}{\partial z}\hat{B}|\psi\rangle \quad \text{Equation (5)}$$

$$|\psi\rangle \equiv \begin{pmatrix} E_t(x,y,z) \\ H_t(x,y,z) \end{pmatrix} e^{-i\omega t}, \; E_t \equiv \begin{pmatrix} E_x \\ E_y \end{pmatrix}$$

$$\hat{A} = \begin{pmatrix} \omega\varepsilon - \frac{1}{\omega}\nabla_t x \frac{1}{\mu}\nabla_t x & 0 \\ 0 & \omega\mu - \frac{1}{\omega}\nabla_t x \frac{1}{\varepsilon}\nabla_t x \end{pmatrix}$$

$$\hat{B} = \begin{pmatrix} 0 & -\hat{z}x \\ \hat{z}x & 0 \end{pmatrix} = \begin{pmatrix} & & & 1 \\ & & -1 & \\ & -1 & & \\ 1 & & & \end{pmatrix} = \hat{B}^{-1}$$

where ω is the angular frequency, ∈ the permittivity, μ the permeability. Here, $E_i$ and $H_i$ are electric and magnetic fields, and Â can be considered a tensorial potential. For a structure that has an isolated n-th waveguide only, the mode solution is given by $|\psi_n\rangle = \exp(i\beta_n z)|n\rangle$, where $|n\rangle$ satisfies $$\left(\hat{A}_n + i\frac{\partial}{\partial z}\hat{B}\right)|n\rangle = \beta_n \hat{B}|n\rangle. \quad \text{Equation (6)}$$

Note that the n-th waveguide's has a cross-section centered at $(x_{n0}, y_{n0})$ with a width $w_n$ and a height h. The mode orthogonality is given by $\langle m^*|\hat{B}|n\rangle = \delta_{mn}\eta_n$, $|\eta_n|=4P$, where P is the optical power of the mode. For normalization, $|\eta_n|$ can be set to unity.

For an array of waveguides, the tensorial potential is given by $$\hat{A} = \hat{A}_0 + \Delta\hat{A}_1 + \Delta\hat{A}_2 + \Delta\hat{A}_3 + \ldots$$

where the $\hat{A}_1$ is the tensorial potential for a homogeneous medium with the index of the cladding material (e.g. the entire space is filled with $SiO_2$ for the structures studied in this work). The tensorial potential for an isolated waveguide n is given by $\hat{A}_n = \hat{A}_0 + \Delta\hat{A}_n$.

An optical mode of a waveguide array is given by mathematical Equations (7) and (8).

$$|\psi\rangle = \sum_n c_n(z)|\psi_n\rangle = \sum_n c_n(z)\exp(i\beta_n z)|n\rangle, \quad \text{Equation (7)}$$

where the coupling amplitude $c_n$ satisfies $$0 = \sum_n c_n \exp(i\beta_n z)\langle m|(\hat{A}-\hat{A}_o)|n\rangle + \sum_n i\frac{\partial c_n}{\partial z}\exp(i\beta_n z)\langle m|\hat{B}|n\rangle. \quad \text{Equation (8)}$$

The final field amplitude (envelope function) in the m-th waveguide mode at z=L is given by mathematical equation (9).

$$u_m(L) = \langle m|B|\psi(L)\rangle = \sum_n \langle m|B|n\rangle c_n(L)\exp(i\beta_m L) \quad \text{Equation (9)}$$

The corresponding optical power is given by $|u_n|^2$ (assuming the power of each mode is normalized). The power conservation is satisfied by $$\sum_n |u_n(L)|^2 = 1.$$

Note $\langle m|B|\psi(L)\rangle$ in mathematical Equation (9) is equivalent to performing an overlap integral at the output.

It can be proved that the crosstalk between waveguides is symmetric for a lossless system. Fundamentally, this can be attributed to fact that both Â and B̂ are symmetric for the propagating modes (with real β) in a lossless system. Mathematical Equation (5) has a formal solution shown by mathematical Equation (10).

$$|\psi(z)\rangle = \exp(iz\hat{B}^{-1}\hat{A})|\psi(0)\rangle \quad \text{Equation (10)}$$

Note $$|\psi(0)\rangle = \sum_n c_n(0)|n\rangle$$

by virtue of mathematical Equation (7). Therefore, the output amplitude in mathematical Equation (9) is given by mathematical Equation (11)

$$u_m(L) = \langle m|\hat{B}|\psi(L)\rangle = \sum_n \langle m|\hat{B}\exp(iL\hat{B}^{-1}\hat{A})|n\rangle c_n(0) \quad \text{Equation (11)}$$

By formal expansion of the exponential, it can be shown that $$\hat{B}\exp(iL\hat{B}^{-1}\hat{A}) = \quad \text{Equation (12)}$$
$$\hat{B} + iL\hat{A} + \frac{(iL)^2}{2!}\hat{A}\hat{B}^{-1}\hat{A} + \frac{(iL)^3}{3!}\hat{A}\hat{B}^{-1}\hat{A}\hat{B}^{-1}\hat{A} + \ldots$$

Since each term of this sum is a symmetric matrix, $\langle m|\hat{B}\exp(iL\hat{B}^{-1}\hat{A})|n\rangle$ in mathematical Equation 11 must be symmetric also.

Noting that this matrix links the output amplitudes $u_m(L)$ to the input amplitudes $c_n(0)$, one readily sees that the crosstalk is symmetric between any waveguides m and n.

The contributions of all coupling paths can be seen from the formal solution Eq. (11) and its expansion Eq. (12). Define an effective coupling matrix $\hat{D}=\hat{B}^{-1}\hat{A}$, The output amplitude can be expressed as $$u_m(L) = \sum_n \langle m|\hat{B}\exp(iL\hat{D})|n\rangle c_n(0) \quad (13)$$
$$= \sum_k B_{mk}\left[\delta_{kn} + iLD_{kn} + \frac{(iL)^2}{2!}\sum_{k_1} D_{kk_1}D_{k_1n} + \frac{(iL)^3}{3!}\sum_{k_1}\sum_{k_2} D_{kk_1}D_{k_1k_2}D_{k_2n} + \ldots\right] c_n(0)$$

Clearly, all possible multiple-step coupling paths are included. For example, the 3-step coupling path #1→#3→#4 is included in the term $$\sum_{k_1}\sum_{k_2} D_{kk_1}D_{k_1k_2}D_{k_2n}.$$

To solve for the coupling amplitude, a phased-amplitude may be computed as shown by mathematical Equation (14)

$$c_n' = c_n \exp(i\beta_n z), \quad \text{Equation (14)}$$

which satisfies the following mathematical Equation (15)

$$0 = \sum_n c_n'\langle m|(\hat{A}-\hat{A}_n)|n\rangle + \sum_n \left(i\frac{\partial c_n'}{\partial z} + \beta_n\right)\langle m|\hat{B}|n\rangle. \quad \text{Equation (15)}$$

Next, the perturbation matrix [ΔA] and metric matrix [B] are defined. The elements of the matrices [ΔA] and [B] are $\Delta A_{mn} = \langle m|(\hat{A}-\hat{A}_n)|n\rangle$ and $B_{mn} = \langle m|\hat{B}|n\rangle$, respectively. Note that $B_{nn}=1$ for normalized modes. In fact, because the mode overlap between adjacent waveguides is small, [B] is close to an identity matrix (off-diagonal $B_{mn} \sim 10^{-2}$ or smaller in most cases), and typically $\langle m|(\hat{A}-\hat{A}_n)|n\rangle/\beta_1 < 0.006$. The phased-amplitude $c_n'$ can be solved from mathematical Equation (16).

$$-i(\partial/\partial z)[c'] = [K][c'], \quad \text{Equation(1316)}$$

where $[c']$ is a column vector with elements $c_n'$ and $[K]=[B]^{-1}[\Delta A]+[\beta]$. $[\beta]$ is the diagonal matrix with elements $\beta_n \delta_{mn}$. For the waveguide superlattices studied in this work, one can readily show that $K_{nn}$ is fairly close to $\beta_n$ and the off-diagonal elements $K_{mn}$ can be regarded as small perturbations compared to $K_{nn}$, considering [B] and $[B]^{-1}$ are both close to an identity matrix (thus $[B]^{-1}[\Delta A]$, just slightly different from [ΔA], remains small perturbations compared to [β]). Based on the Gershgorin circle theorem [2], the eigenvalues $\Lambda_n$ of [K] should satisfy $\Lambda_n \approx K_{nn} + O(\kappa)$. More precisely, it can be show that $$|\Lambda_n - K_{nn}| < \sum_{k\neq n} |K_{nk}|.$$

Then it follows that the phase mismatch $\Lambda_m - \Lambda_n$ will be much larger than any coupling term if $$|K_{mm} - K_{nn}| \gg \sum_{k\neq m} |K_{nk}| + \sum_{k\neq n} |K_{nk}|.$$

With this theory, the coupling may be simulated in various waveguide superlattices and pairs. The trend of the crosstalk between a pair of waveguides as the width of the second waveguide varies is shown in FIG. 2(a). Evidently, it is not always advantageous to increase the width difference between two waveguides. This is because both Δβ and κ varies, as $w_2$ changes. For very small $w_2$, the influence of κ increase overtakes that of Δβ increase.

Figure 6:
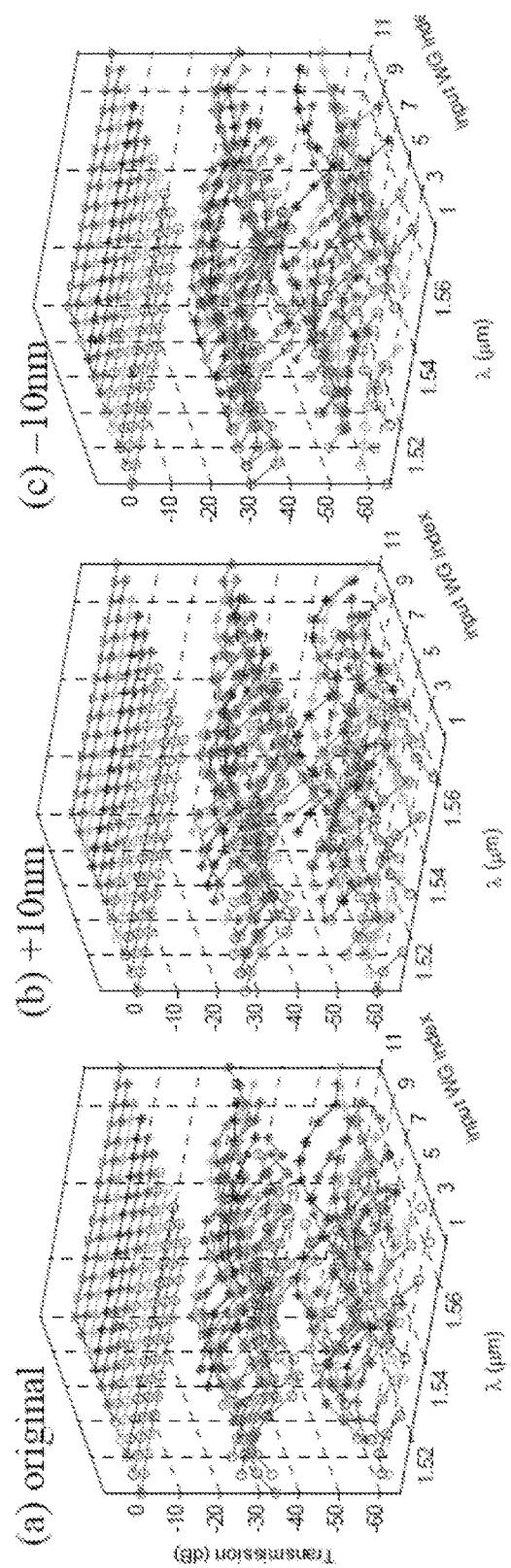
FIG. 6 comprises a graph (a) showing simulation results for an SC5 superlattice with a 0.8 μm pitch and a 500 μm propagation distance, a graph (b) showing simulation results for an SC5 superlattice with the widths of all waveguides reduced by 10 nm, and a graph (c) showing simulation results for an SC5 superlattice with the widths of all waveguides increased by 10 nm.

The simulation result of a sophisticated superlattice with a 5-waveguide supercell (SC5) is shown in FIG. 6(a). The structure is fairly robust against an overall drift of all waveguide widths by ±10 nm (FIG. 6(b) and (6c)), which could occur in real waveguide fabrication. The worst case crosstalk changes from −23.9 dB to −24.5 dB and −23.4 dB for Δw=+10 nm and −10 nm, respectively.

The effect of sidewall roughness-induced scattering can be treated using a perturbation potential shown by mathematical Equation (17).

$$\Delta\hat{A}_{rough} = \begin{pmatrix} \omega\Delta\varepsilon - \frac{1}{\omega}\nabla_t \times \frac{1}{\mu}\nabla_t \times & 0 \\ 0 & \omega\mu - \frac{1}{\omega}\nabla_t \times \Delta\frac{1}{\varepsilon}\nabla_t \times \end{pmatrix} \quad \text{Equation (17)}$$

where $\Delta\in$ and $\Delta(\in^{-1})$ account for dielectric function perturbation due to roughness. Scattering amplitude from one mode to another can then be calculated. The mathematical details of theory are known. Physically, roughness causes two disparate effects. On the one hand, roughness causes inter-modal (inter-waveguide) scattering, which causes extra incoherent crosstalk. On the other hand, roughness effectively modifies the waveguide widths randomly. This produces a small random variation of propagation constant $\delta\beta_{rough}$ (or a phase dither) so that substantially identical waveguides in adjacent supercells (e.g. indexed by $\mu_1$, $\mu_2$) have a small random phase mismatch $\delta\beta_{rough,\mu 2} - \delta\beta_{rough,\mu 1}$, which helps to reduce coherent coupling (crosstalk) specifically between substantially identical waveguides. Note that for a superlattice with large supercells, substantially identical waveguides are far apart and their coupling is weak. Hence a small phase mismatch is enough to suppress their crosstalk. 100 random instances of a SC5 superlattice are simulated with given roughness parameters and plotted the ensemble-averaged transmission spectra in FIG. 7 for different roughness parameters. The bottom chart shows the statistics of transmission fluctuation (indicated by error bars) for two representative crosstalk channels. The rms roughness of the waveguides made through ma-N and HSQ resists were obtained from high resolution (e.g., ~0.5 nm image pixels) SEM images to be around 2 nm and 3 nm, respectively. The correlation lengths are also estimated to be around 30 nm and 50 nm, respectively. These parameters have been used in the simulations in FIG. 7 [(a) ma-N and (b) HSQ]. The standard deviations of the representative crosstalk channels are shown by error bars in the lower part of FIG. 7. Whereas FIG. 7 focuses on scattering between the modes of different waveguides, we should note that roughness may also induce backscattering and out-of-plane scattering into radiation modes, which produces additional loss and noise in each waveguide. Under weak scattering conditions (applicable to low-loss waveguides where multiple scattering is negligible), these two other scattering processes generally have little direct effect on the crosstalk. Experimentally, they may indirectly affect crosstalk through the relative loss difference between narrow and wide waveguides and noise for crosstalk defined as $XT(i,j)=T_{ij}(\lambda)-T_{ii}(\lambda)$. But such indirect effects are generally weak for high-quality HSQ-based structures where backscattering and out-of-plane scattering are very weak, the propagation loss is low, and the relative loss difference between waveguides is small.

Note that for a finite waveguide lattice, the waveguides near the boundary generally have fewer neighbors than the waveguide in the bulk. However, simulations have shown that this has very small influence to the crosstalk. For example, for the SC5 superlattice in FIG. 2(c), waveguide pair (#1, #2) and waveguide pair (#6, #7) have the same widths except the former is on the boundary. The simulated peak crosstalk for $XT_{max}(1,2)$ and $XT_{max}(6,7)$ differ less than 0.5 dB. Fundamentally, this is because the elements of the perturbation matrix [K] have small differences for waveguides on the boundary and those in the bulk. For example, the relative difference between $K_{12}$ and $K_{67}$ is less than $10^{-3}$ (of course, this may increase for a<0.8 μm). The experimental results in FIGS. 3(b), (d), and (f) also showed that the waveguides near boundary did not show a clear trend of higher or lower crosstalk than the corresponding ones far from the boundary.

In this proof-of-concept study, the waveguide superlattices have lengths L≤500 μm. Such lengths are sufficient for some applications including output waveguide arrays in optical phased arrays and input/output waveguide arrays in wavelength (de)multiplexers. For other applications that need longer superlattices, we have simulated the performance at longer L. FIG. 8 shows the statistics of crosstalk (mean and standard deviation) calculated over all random configurations and the spectral range (1500~1570 nm). Clearly, after an initial 100~200 μm of rapid increase and then some oscillation, the crosstalk statistics enters a stage of stable evolution as L further increases. At L≥~300 μm, for those pertinent crosstalk channels, the mean crosstalk (<XT>) remains almost flat, with very small undulation. The standard deviation of the crosstalk ($\sigma_{XT}$), which depends on random scattering and coherent coupling in the superlattice, increases at a very slow rate with L.

Fabrication of long superlattices will need tight process control (e.g. width uniformity, roughness control, particle contamination control, and defect control) over a large area, which is suitable for mass-production-grade CMOS foundries. Note that large-area tight process control is important here as the overall crosstalk of a large array is dictated by the worse crosstalk channel, and hence is susceptible to merely a single imperfection. As the area increases, the chance of having a single imperfection (e.g. contamination by a single airborne particle) goes up. In addition, high-end foundries can achieve roughness lower than the value used in the simulation of FIG. 8. This can further reduce crosstalk for even longer superlattices. Note that fabrication in this work was done in an academic-grade cleanroom shared by many users with moderate contamination control, which is usually suitable for small-scale proof-of-concept study only.

For reference, experimentally measured crosstalk between nearest waveguides and second nearest waveguides in a superlattice of waveguide pairs (or SC2, $w_1$=450 nm, $w_2$=300 nm, and L=200 μm) are shown in FIG. 9(a)-(c). Even for a relatively large a=1 μm, two waveguides of w=450 nm separated by $a_s$=2a (second-nearest neighbor) showed a high relative crosstalk T(i,i+2)–T(i,i) around –14 dB, shown in FIG. 9(b). For a=0.8 μm, the relative crosstalk for the second-nearest neighbor could be as high as –4 dB shown in FIG. 9(c).

Figure 11:
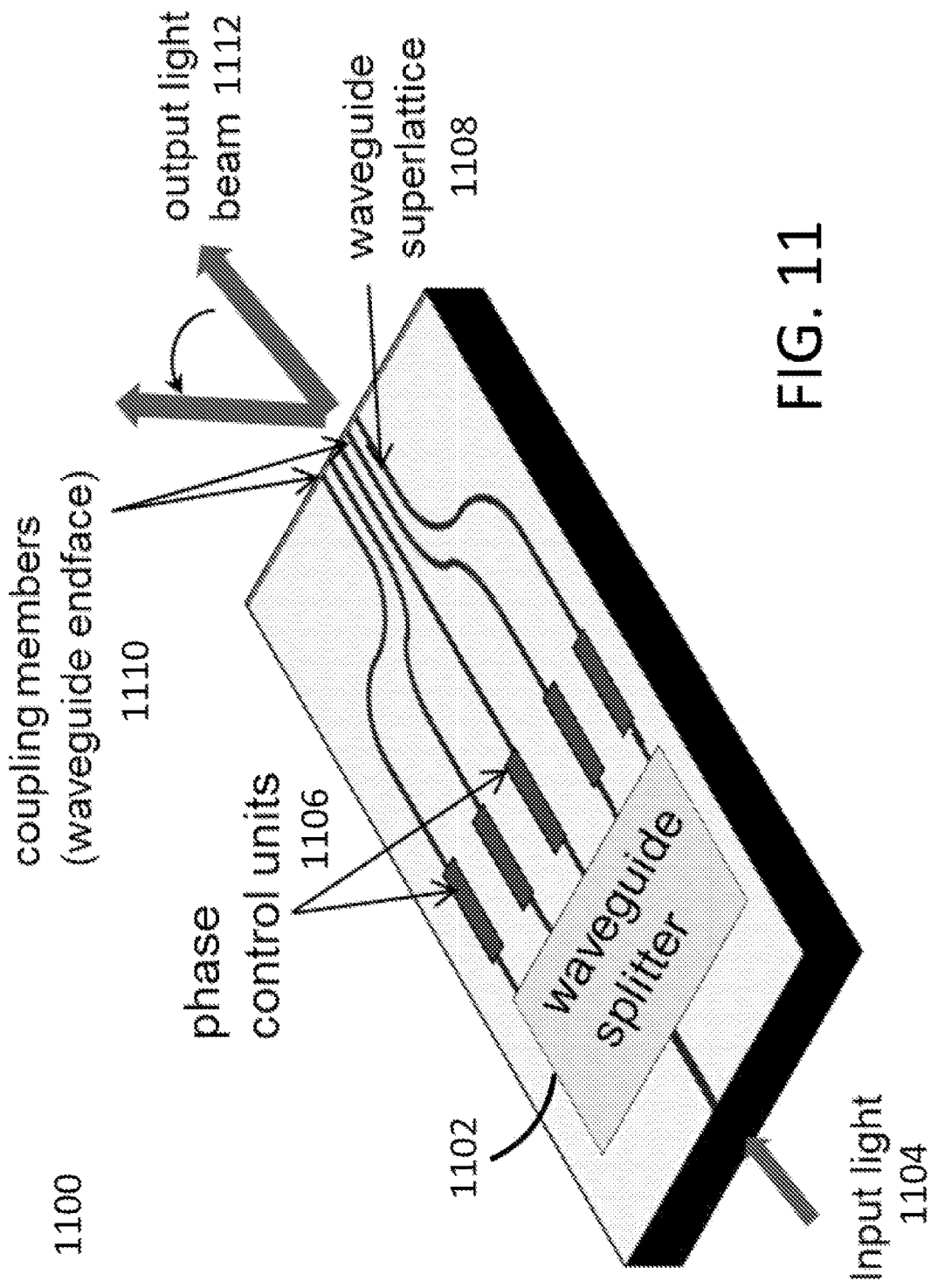
FIG. 11 shows an example of an optical phased array (OPA).

An optical phased array (OPA) can directly radiate light from the endfaces of a waveguide array. In an example shown in FIG. 11, an OPA 1100 may include a waveguide splitter 1102 configured to split an incoming light signal 1104 into a plurality of light signals and one or more phase control units 1106, each configured to modify a phase of one of the plurality of light signals. Additionally, an OPA 1100 may include a plurality of waveguides 1108 respectively coupled to the plurality of phase control units 1106, wherein a propagation constant of each waveguide is different from adjacent waveguides and the difference between the propagation constants of any two adjacent waveguides is substantially larger than an effective coupling constant between said two adjacent waveguides. Coupling members 1110 may couple the light signal in each of the plurality of waveguides to free space. In practice, a coupling member to free space may comprise a waveguide endface or a grating. The light signal propogates through free space as output light beam 1112.

Light from an optical phased array (OPA) often forms a number of beams, termed "grating lobes" [3], in the far field. Decreasing the emitter pitch in an optical phased array will increase the angular separation between the primary beam and the unwanted secondary beams. As the pitch decreases below λ/2, the angular separation is so large that no secondary beams appear in the range of –90° to +900. As such, a full beam steering range of –90° to +90° can be achieved. Such an OPA is considered ideal [3] and has long been pursued. The waveguide superlattice demonstrated in FIG. 4 enables us to squeeze phase-modulated signals into emitters at λ/2-pitch. For example, in the OPA structure in Ref. [4], the phase-modulated signals from a sparse array of active phase-shifters are routed to an output waveguide array, and then radiate to free-space from the waveguide endfaces. The pitch of this output waveguide array is critical. Replacing the large-pitch (e.g. ~3 μm in Ref. [4]) output waveguide array with a λ/2-pitch SC5 superlattice will eliminate all unwanted secondary beams, enabling full beam steering of –90° to +90°. Note that L=200 μm should suffice for a superlattice used in such an OPA, there is no need for the signals to co-propagate longer in the superlattice.

The performance of an OPA that comprises a λ/2-pitch waveguide superlattice at the output can be readily calculated based on the phased array theory [5]. In an OPA, the angle of the primary beam (0-th order lobe), $\theta_0$, is given by Equation (17).

$$\sin \theta_0 = \Delta\phi(\lambda/2\pi a).$$                              Equation (17)

where a is the element pitch, and $\Delta\phi$ is the phase difference between adjacent elements. The angles of other grating lobes are given by Equation (18).

$$\sin\theta_n = n\lambda/a + \sin\theta_0. \quad \text{Equation (18)}$$

Figure 10:
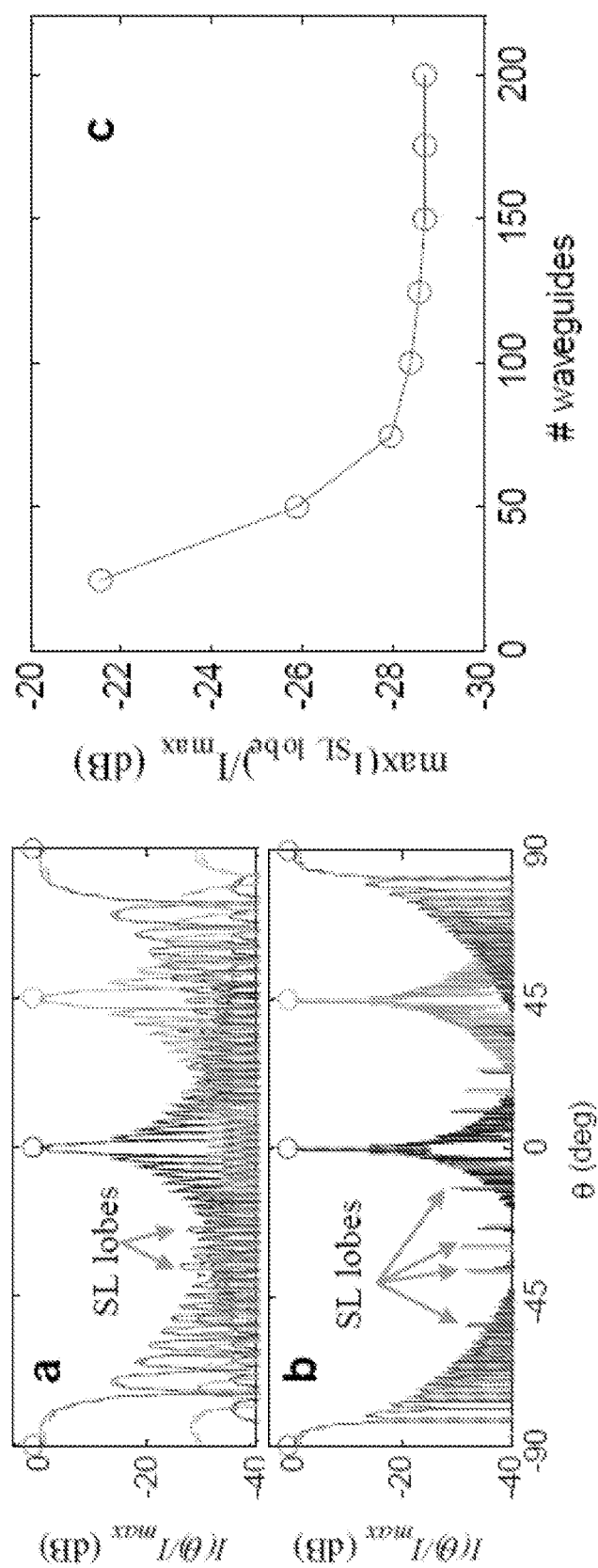
FIG. 10 shows far field profile of an optical phased array with a SC5 superlattice with a=λ/2; (a) 50 waveguides; (b) 200 waveguides; (c) maximum superlattice-induced lobe vs. array size.

In waveguide-based optical phased arrays where light radiates from the endfaces of a waveguide array [4], decreasing the pitch a of the waveguide array can increase the angular separation between grating lobes in the far field. Eventually, as the pitch decreases below half wavelength ($a \leq \lambda/2$), equation (18) gives $|\sin\theta_{n \neq 0}| \geq 1$ regardless of the value of $\theta_0$, which indicates all $n \neq 0$ grating lobes effectively disappear. This means that as the beam is steered over the full range (from $-90°$ to $+90°$) by varying $\Delta\phi$, there is always a single beam in the far field, which is ideal for beam steering applications. For an OPA that radiates light through the endfaces of a waveguide superlattice of FIG. 10, the far field beam profile is shown in FIG. 10(a)-(b) for $\lambda=1560$ nm, $a=\lambda/2=780$ nm and $\theta_0=0$. Here the light power in each waveguide is assumed to be the same. For simplicity, the power density is assumed to be uniform across the waveguide cross-section. The beam profiles of a waveguide superlattice OPA are plotted in solid lines for $\theta_0=0°$ (a), $45°$ (b), and $90°$ (c). The primary beam (main lobe) directions agree well with the values calculated from $\sin\theta_0 = \Delta\phi(\lambda/2\pi a)$ (marked by circles). For $\theta_0=90°$, a grating lobe barely appears at $\theta_{-1}=\arcsin(-\lambda/a + \sin\theta_0) = -90°$. Note that for a larger array [e.g. 200 waveguides in FIG. 10(c)], the grating lobe at $-90°$ is narrow and practically have negligible influence on the OPA steering range (this can also be further improved by operating at a longer $\lambda=1570$ nm or $a<0.5\lambda$ so that the grating lobe peak is completely pushed out of $[-90°, 90°]$). Furthermore, the beam profiles of a reference whose emitters are assumed to all have the same width w=450 nm are plotted as dashed lines. Note that beam profiles of the reference OPA is intentionally shifted down slightly to help distinguish the solid lines from dashed lines. The beam profiles for the superlattice OPA and the reference OPA are very close to each other except at some minor lobes (named "SL lobes" herein) generated by the superlattice. This is because the key characteristics of a phased array are essentially determined by the spatial resolution of phase-front modulation, which equals $\lambda/2$ in both the superlattice OPA and the reference OPA. The longer superlattice periodicity $a_s$ only induces some very weak SL lobes: for an OPA of 200 waveguides, the highest SL lobe is $<-28$ dB. The dependence of the maximum SL lobes on the lattice size is shown in FIG. 10(c). This affirms that the waveguide superlattice structure, while increasing the beam steering range to its fullest ($-90°$ to $90°$), has little practical impact on the far-field beam profile.

Note that the phase difference between waveguides of different widths in a superlattice can be easily compensated. Generally, there is a routing waveguide connecting each active phase-shifter and each emitter (a waveguide in the superlattice). The phase difference between different waveguides in the superlattice can be easily compensated by adjusting the widths of individual routing waveguides. For example, for a narrow waveguide in the superlattice, its routing waveguide can be wider.

For an OPA, another important benefit of introducing a $\lambda/2$-pitch waveguide superlattice is that it can reduce the device power consumption. For a given phase shift $\Delta\phi$, the beam angle is inversely proportional to the pitch, $\sin\theta_0 = \Delta\phi(\lambda/2\pi a)$. The disclosed embodiments (e.g., $a \sim 780$ nm) decrease the pitch by about 4 fold compared to conventional methods, the current waveguide array only needs four-times smaller phase-shift $\Delta\phi$, to achieve a given beam angle. This translates into four times or more power reduction for the phase-tuning elements (depending on thermo-optic or electro-optic phase tuning). Such a significant reduction of power consumption is particularly important for large-scale OPAs where thermal management can be a critical issue.

In application to wavelength demultiplexers, the propagation constant of each output waveguide of a demultiplexer is different from adjacent output waveguides. The difference between the propagation constants of any two adjacent output waveguides may be substantially larger than the effective coupling constant between said two adjacent output waveguides, for example. In some demultiplexers, a dispersion element splitting an incoming light signal may include a plurality of light signals each having a different wavelength. Each split light signal may be coupled into one of the plurality of output waveguides. The waveguide superlattice provides a smaller pitch for the output waveguides of a demultiplexer. Such a smaller pitch may result in a higher resolution of wavelength channels for many common types of demultiplexers, such as those based on diffraction grating or arrayed waveguide grating. The demultiplexer may comprise other conventional parts including an input waveguide.

In some scenarios, the difference between the propagation constants of said two adjacent output waveguides may be obtained by making the plurality of output waveguides with different widths. For example, in some scenarios, the nominal widths of the plurality of output waveguides may vary periodically with the index of the plurality of output waveguides. In some scenarios, the nominal widths of the output waveguides may be identical for every two, three, four, five, or more output waveguides. In some scenarios any two of the plurality of output waveguides have the smallest difference of width may be separated by at least one other output waveguide. In some scenarios, the width of each output waveguide may include a small random variation which may be set by a fabrication process.

In other scenarios, the difference between the propagation constants of said two adjacent output waveguides may be obtained by making the plurality of output waveguides with different heights.

For example, difference between the propagation constants of said two adjacent output waveguides may be obtained by incorporating different materials into different ones of the plurality of output waveguides. In some scenarios, the nominal propagation constants of the plurality of output waveguides may vary periodically with the index of the plurality of output waveguides. In some scenarios, the nominal propagation constants of the plurality of output waveguides may be identical for every two, three, four, five, or more output waveguides. In some scenarios, any two of the plurality of output waveguides that have the smallest difference of propagation constant may be separated by at least one other output waveguide. In some scenarios, the propagation constant of each output waveguide may include a small random variation which is set by a fabrication process.

In applications to wavelength multiplexers, a propagation constant of each input waveguide of a multiplexer may be different from adjacent input waveguides. The difference between the propagation constants of any two adjacent input waveguides may be substantially larger than the effective coupling constant between said two adjacent input waveguides. A dispersion element may combine a plurality of light signals of different wavelengths that are coupled from one of the plurality of input waveguides. The waveguide superlattice provides a smaller pitch for the input waveguides of a multiplexer. Such a smaller pitch may result in a higher resolution of wavelength channels for many common types of multiplexers, including those based on diffraction grating or arrayed waveguide grating. The multiplexer may comprise other conventional parts including an output waveguide.

In some scenarios, the difference between the propagation constants of the two adjacent input waveguides may be obtained by making the plurality of input waveguides with different widths, for example. For example, in some scenarios, the nominal widths of the plurality of input waveguides may vary periodically with the index of the input waveguides. In some scenarios, the nominal widths of the plurality of input waveguides may be identical for every two, three, four, five, or more input waveguides. In some scenarios, any two of the plurality of input waveguides that have the smallest difference of width may be separated by at least one other input waveguide in-between. In some scenarios, the width of each input waveguide comprises a small random variation which may be set by fabrication process.

In other scenarios, the difference between the propagation constants of the two adjacent input waveguides may be obtained by making the plurality of input waveguides with different heights.

In some scenarios the difference between the propagation constants of the two adjacent input waveguides may be obtained by incorporating different materials into different individual input waveguides.

In some scenarios, the nominal propagation constants of the plurality of input waveguides may vary periodically with the index of the plurality of input waveguides. In some scenarios, the nominal propagation constants of the plurality of input waveguides may be identical for every two, three, four, five, or more input waveguides. In some scenarios, any two of the plurality of input waveguides that have the smallest difference of propagation constant may be separated by at least one other input waveguide. In some scenarios, the propagation constant of each input waveguide may include a small random variation which is set by a fabrication process.

The width and height of a waveguide in this document may be understood by one skilled in the relevant art according to the type of waveguides chosen. For example, in some scenarios, rib waveguides are used to form the superlattice. In such scenarios, the waveguide width may refer to the rib width and the waveguide height may refer to the rib height, the slab height, or a certain combination of these two. In other scenarios, the width or height of a waveguide may refer to two characteristic lengths of the waveguide cross-section in the horizontal and vertical directions, respectively. In some scenarios where the waveguide cross-section is not a rectangle (e.g. a trapezoid) or comprises multiple materials, the width or height may be considered an average width or an average height, or other effective measure of the width and height. The average method may comprise arithmetic mean, geometric mean, harmonic mean, weighted mean (wherein the weight may be related to the optical field, the refractive indices of waveguide materials, or other relevant quantities), or other averaging schemes.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the an are deemed to be within the spirit, scope and concept of the invention as defined.

I claim:

1. An apparatus for transmitting a plurality of channels of light signals having a wavelength, comprising:
    a waveguide superlattice comprising one or more supercells, each supercell comprising a plurality of waveguides, wherein at least one of the respective width, height and material of each waveguide differ to the extent that:
        a propagation constant of each waveguide is different from that of adjacent waveguides;
        a spacing between any of the plurality of waveguides is less than the wavelength; and
        the difference between the effective propagation constants of any two waveguides in the supercell is substantially larger than an effective coupling constant therebetween so that a crosstalk among the two waveguides is suppressed.

2. The apparatus of claim 1, wherein the difference between the propagation constants of said two adjacent waveguides is obtained by making said plurality of waveguides with different widths.

3. The apparatus of claim 1, wherein the difference between the propagation constants of said two adjacent waveguides is obtained by making said plurality of waveguides with different heights.

4. The apparatus of claim 1, wherein the difference between the propagation constants of said two adjacent waveguides is obtained by incorporating different materials into different ones of the plurality of waveguides.

5. The apparatus of claim 1, wherein the nominal propagation constants of the waveguides are identical for every two, three, four, five, or more waveguides (i.e. $\beta_{i+5}=\beta_i$).

6. The apparatus of claim 1, wherein any two of the plurality of waveguides having the smallest difference between the nominal propagation constant are separated by at least one other waveguide in-between.

7. The apparatus of claim 1, wherein the propagation constant of each of the plurality of waveguides comprises a small random variation which is set by fabrication process.

8. The apparatus of claim 2, wherein nominal widths of the plurality of waveguides are identical for every two, three, four, five, or more waveguides.

9. The apparatus of claim 2, wherein any two of the plurality of waveguides that have the smallest difference of nominal width are separated by at least one other waveguide in-between.

10. The apparatus of claim 2, wherein the width of each of the plurality of waveguides comprises a small random variation which is set by fabrication process.

11. An apparatus for transmitting a plurality of light signals having a wavelength, comprising:
    a splitter configured to split an incoming light signal into a plurality of light signals;
    a plurality of phase control units, each configured to modify a phase of one of the plurality of light signals;
    a waveguide superlattice comprising one or more supercells, each supercell comprising a plurality of waveguides respectively coupled to the plurality of phase control units; and a plurality of coupling members, each coupling the light signal in one of the plurality of waveguides to free space;
wherein at least one of the respective width, height and material of each waveguide differ to the extent that:
the difference between the effective propagation constants of any two waveguides in each supercell is substantially larger than an effective coupling constant therebetween so that a crosstalk among the two waveguides is suppressed, and
a spacing between any of the plurality of waveguides is less than the wavelength.

12. The apparatus of claim 11, wherein the difference between the propagation constants of said two adjacent waveguides is obtained by making the plurality of waveguides with different widths.

13. The apparatus of claim 11, wherein the difference between the propagation constants of said two adjacent waveguides is obtained by making the plurality of waveguides with different heights.

14. The apparatus of claim 11, wherein the difference between the propagation constants of said two adjacent waveguides is obtained by incorporating different materials into different ones of the plurality of waveguides.

15. The apparatus of claim 11, wherein nominal propagation constants of the plurality of waveguides are identical for every two, three, four, five, or more waveguides.

16. The apparatus of claim 11, wherein any two of the plurality of waveguides that have the smallest difference of nominal propagation constant are separated by at least one other waveguide in-between.

17. The apparatus of claim 11, wherein the propagation constant of each waveguide comprises a small random variation which is set by fabrication process.

18. An apparatus for splitting a plurality of light signals each having a different wavelength, comprising:
a waveguide superlattice comprising one or more supercells, each supercell comprising a plurality of output waveguides, wherein at least one of the respective width, height and material of each waveguide differ to the extent that:
a propagation constant of each output waveguide is different from that of adjacent output waveguides,
a spacing between any of the plurality of waveguides is less than the wavelength of any of the plurality of light signals, and
the difference between the effective propagation constants of any two waveguides in each supercell is substantially larger than an effective coupling constant therebetween so that a crosstalk among the two waveguides is suppressed; and
a dispersion element configured to split an incoming light signal comprising a plurality of light signals each having a different wavelength, each split light signal being coupled into one of the plurality of output waveguides.

19. The apparatus of claim 18, wherein the difference between the propagation constants of said two adjacent output waveguides is obtained by making the plurality of output waveguides with different widths.

20. The apparatus of claim 18, wherein the difference between the propagation constants of said two adjacent output waveguides is obtained by making the plurality of output waveguides with different heights.

21. The apparatus of claim 18, wherein the difference between the propagation constants of said two adjacent output waveguides is obtained by incorporating different materials into different ones of the plurality of output waveguides.

22. The apparatus of claim 18, wherein nominal propagation constants of the plurality of output waveguides are identical for every two, three, four, five, or more output waveguides.

23. The apparatus of claim 18, wherein any two of the plurality of output waveguides that have the smallest difference of nominal propagation constant are separated by at least one other output waveguide in-between.

24. The apparatus of claim 18, wherein the propagation constant of each output waveguide comprises a small random variation which is set by fabrication process.

25. The apparatus of claim 19, wherein nominal widths of the output waveguides are identical for every two, three, four, five, or more output waveguides.

26. The apparatus of claim 19, wherein any two of the plurality of output waveguides that have the smallest difference of nominal width are separated by at least one other output waveguide in-between.

27. The apparatus of claim 19, wherein the width of each output waveguide comprises a small random variation which is set by fabrication process.

28. The apparatus of claim 1, wherein the plurality of light signals are used for space-division multiplexing.

29. The apparatus of claim 1, wherein the effective coupling constant between any two waveguides m, n in the supercell is based on $$\sum_{k \neq m} |K_{mk}| + \sum_{k \neq n} |K_{nk}|$$

where K is a perturbation matrix, k corresponds to one of the plurality of waveguides in the superlattice, $K_{mk}$ is indicative of a perturbation between the two waveguides m and k in the superlattice, and $K_{nk}$ is indicative of a perturbation between the two waveguides n and k in the superlattice.

30. An apparatus for combining a plurality of light signals each having a different wavelength, comprising:
a waveguide superlattice comprising one or more supercells, each supercell comprising a plurality of input waveguides, wherein the respective width, height or material of each input waveguide differ to the extent that:
a propagation constant of each input waveguide is different from that of adjacent input waveguides,
a spacing between any of the plurality of input waveguides is less than the wavelength of any of the plurality of light signals, and
the difference between the effective propagation constants of any two waveguides in each supercell is substantially larger than an effective coupling constant therebetween so that a crosstalk among the two waveguides is suppressed; and
a dispersion element configured to combine a plurality of light signals each having a different wavelength, each light signal being coupled from one of the plurality of input waveguides.

* * * * *

UNITED STATES PATENT AND TRADEMARK OFFICE
CERTIFICATE OF CORRECTION

PATENT NO. : 9,784,914 B2
APPLICATION NO. : 15/021845
DATED : October 10, 2017
INVENTOR(S) : Jiang Page 1 of 1

It is certified that error appears in the above-identified patent and that said Letters Patent is hereby corrected as shown below:

In the Specification

At Column 1, Line number 14, please enter the following:
STATEMENT REGARDING FEDERALLY SPONSORED RESEARCH
This invention was made with government support under grant number FA9550-08-1-0394 awarded by the United States Air Force Office of Scientific Research and grant number DE-AC02-98CH10886 awarded by the Department of Energy. The government has certain rights in the invention.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*